United States Patent
Zillmann

(10) Patent No.: US 7,104,097 B2
(45) Date of Patent: Sep. 12, 2006

(54) DEVICE FOR BLOCKING THE STEERING SPINDLE OF A MOTOR VEHICLE

(75) Inventor: Horst Zillmann, Munich (DE)

(73) Assignee: Huf Hulsbeck & Furst GmbH & Co. KG, Velbert (DE)

( * ) Notice: Subject to any disclaimer, the term of this patent is extended or adjusted under 35 U.S.C. 154(b) by 0 days.

(21) Appl. No.: 10/486,368

(22) PCT Filed: Nov. 4, 2002

(86) PCT No.: PCT/EP02/12291

§ 371 (c)(1),
(2), (4) Date: Mar. 2, 2004

(87) PCT Pub. No.: WO03/042014

PCT Pub. Date: May 22, 2003

(65) Prior Publication Data

US 2004/0251671 A1 Dec. 16, 2004

(30) Foreign Application Priority Data

Nov. 16, 2001 (DE) .............................. 101 56 335

(51) Int. Cl.
*B60R 25/02* (2006.01)

(52) U.S. Cl. ...................................................... 70/186

(58) Field of Classification Search .......... 70/182–186, 70/252
See application file for complete search history.

(56) References Cited

U.S. PATENT DOCUMENTS

| | | | |
|---|---|---|---|
| 1,251,987 A * | 1/1918 | McFarland ................... | 70/185 |
| 1,268,137 A | 6/1918 | Mailloux | |
| 1,342,728 A | 6/1920 | Welch | |
| 1,345,014 A * | 6/1920 | Kendall ....................... | 70/185 |
| 1,377,100 A * | 5/1921 | Smith .......................... | 70/185 |
| 1,462,137 A * | 7/1923 | Hill ............................. | 70/185 |
| 1,518,150 A | 12/1924 | Kelly | |
| 2,032,821 A * | 3/1936 | Waits .......................... | 70/185 |
| 2,222,900 A * | 11/1940 | Fruns .......................... | 70/186 |
| 3,919,867 A * | 11/1975 | Lipschutz et al. ............ | 70/186 |
| 4,854,142 A * | 8/1989 | Peitsmeier et al. ........... | 70/186 |
| 5,730,010 A * | 3/1998 | Norimatsu et al. ........... | 70/186 |
| 6,810,700 B1 * | 11/2004 | Okuno ......................... | 70/186 |

FOREIGN PATENT DOCUMENTS

| | | |
|---|---|---|
| DE | 1603844 | 3/1949 |
| DE | 1119696 | 12/1961 |
| DE | 1204091 | 10/1965 |
| DE | 2323387 | 11/1973 |
| DE | 3606564 | 6/1987 |
| DE | 3626014 | 6/1989 |
| DE | 4219853 | 11/1993 |
| DE | 19906268 | 2/2000 |
| DE | 19815311 | 3/2000 |

(Continued)

*Primary Examiner*—Lloyd A. Gall
(74) *Attorney, Agent, or Firm*—Bacon & Thomas, PLLC

(57) ABSTRACT

A device for irrotationally locking a motor vehicle's steering shaft (1) using a locking element (2) located within a housing (8) and displaceable to-and-fro between a locking and a release position. The housing (8) is detachably affixed to a tubular casing (5) enclosing the steering shaft (1) and comprising a receptacle (18) that receives the housing (8) being inserted therein. According to the invention and for the sake of easy assembly and disassembly and high security against theft and easy manufacture, the housing (8) is pushed into the receptacle (18) in a direction transverse to the longitudinal axis (10) of the tubular casing (5).

17 Claims, 14 Drawing Sheets

FOREIGN PATENT DOCUMENTS

| | | | |
|---|---|---|---|
| DE | 19906302 | 3/2000 | |
| DE | 10156335 | 6/2003 | |
| EP | 0365423 | 4/1990 | |
| EP | 0764566 | 3/1997 | |
| EP | 0957015 | 11/1999 | |
| EP | 0987153 | 3/2000 | |
| FR | 915086 | * 10/1946 | ........... 70/186 |
| FR | 1418109 | 10/1965 | |
| FR | 1605119 | 3/1973 | |
| FR | 2780012 | 12/1999 | |
| FR | 2783218 | 3/2000 | |
| FR | 2783219 | 3/2000 | |
| FR | 2783220 | 3/2000 | |
| FR | 2783221 | 3/2000 | |
| FR | 2783781 | 3/2000 | |

* cited by examiner

DEVICE FOR BLOCKING THE STEERING SPINDLE OF A MOTOR VEHICLE

BACKGROUND OF THE INVENTION

A. Field

The present invention relates to a device for irrotationally locking a motor-vehicle's steering spindle, hereafter steering shaft by means of a locking element which is displaceable to-and-fro within a housing between a locking and a release position, said housing being detachably affixed to a tubular casing enclosing the steering shaft and the casing being fitted with a receptacle receiving the inserted housing.

B. Related Art

Such devices irrotationally locking motor vehicle steering shafts are known in a variety of designs. Among these are those whereby the housing is inserted into the receptacle perpendicularly or nearly perpendicularly to the tubular casing's longitudinal axis (FR 1,605,119 A; DE 23 23 387 A; DE 36 06 564 C; DE 36 26 014 C; EP 0,365,423 A; DE 42 19 853 C; EP 0,764,566 C; FR 2,783,218 A; FR 2,783,219 A; FR 2,783,220 A; FR 2,783,221 A and DE 198 15 311 C) and further those wherein the housing is inserted in a parallel manner to the tubular casing's longitudinal axis (DE 1,603,844 U; DE 1,119,696 B; DE 1,204,091 B and DE 199 06 302 C).

BRIEF SUMMARY OF THE INVENTION

The objective of the present invention is to create a device of the initially cited kind which assures in simple and economical manner easy assembly of the housing on the tubular casing and equally easy disassembly of the housing from the tubular casing, while effecting high security against unauthorized disassembly as well as against forceful removal of the housing from the tubular casing and enabling problem-free manufacture by casting of the tubular casing.

BRIEF DESCRIPTION OF THE DRAWINGS

Two embodiments of the device of the invention for locking a motor vehicle steering shaft are described below by way of example in relation to the appended drawings.

DETAILED DESCRIPTION OF PREFERRED EMBODIMENTS OF THE INVENTION

Figure 1:
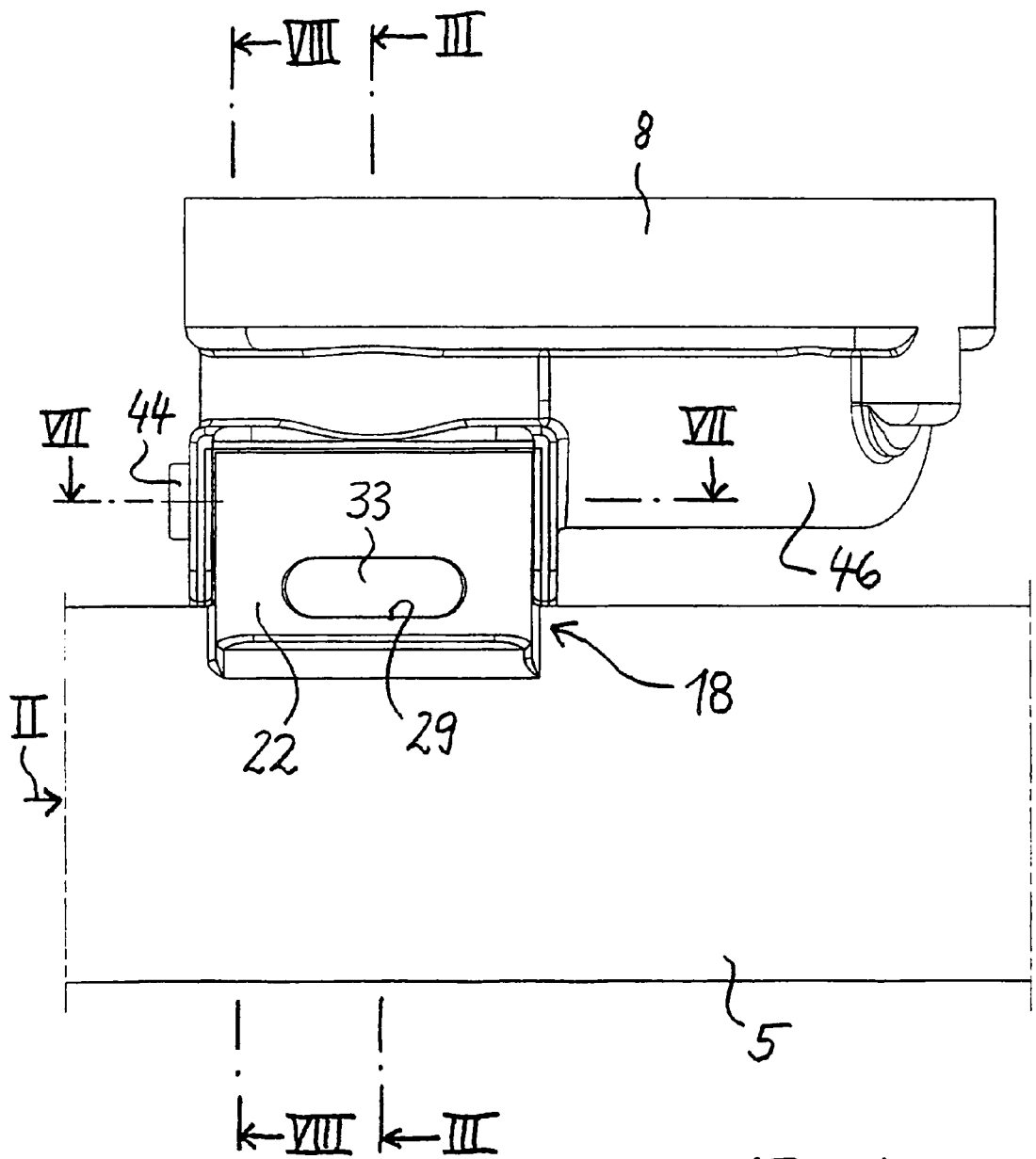
FIG. 1 is the view of a first embodiment in the direction of the arrow I of FIG. 2.

The shown devices for irrotationally locking a motor-vehicle's steering shaft 1 each comprise a locking element 2 cooperating with a locking bush 3 secured to the steering shaft 1 and fitted with locking grooves 4. The steering shaft 1 and the locking bush 3 are enclosed by a tubular casing 5 fitted with an aperture 6 passing the locking element 2.

The locking element 2 is a bolt having a rectangular cross-section and rests in an axially displaceable manner in a cross-sectionally matched opening 7 which is located in a housing 8 and which extends towards the locking element passage aperture 6 of the same cross-section in the tubular casing 5, the longitudinal axis 9 of said opening 7 orthogonally intersecting the common longitudinal axis 10 of the steering shaft 1 and its coaxial tubular casing 5. The housing 8 is sealed by a lid 11 and detachably affixed to the tubular casing 5.

Figure 2:
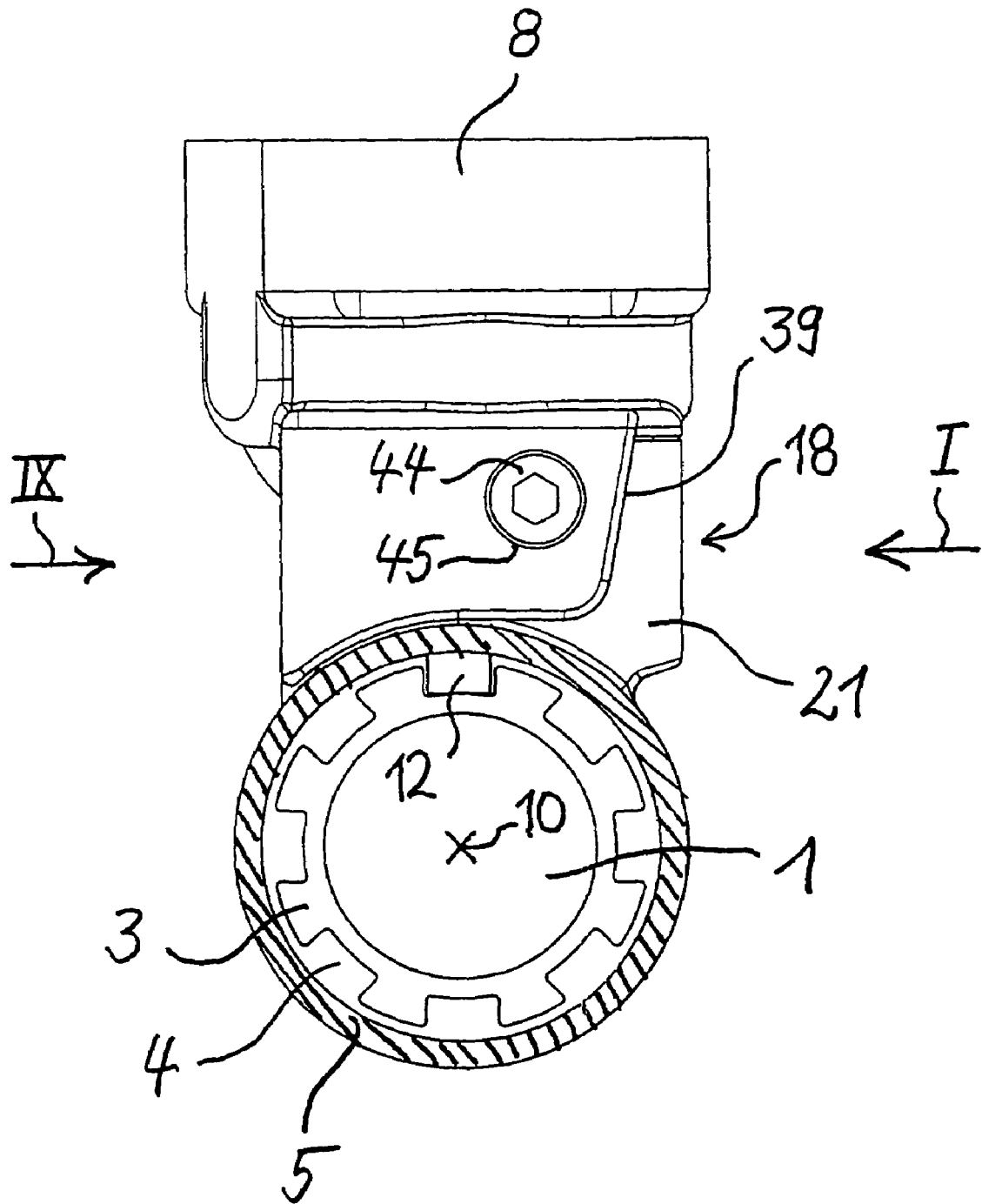
FIG. 2 is the view in the direction of the arrow II of FIG. 1, the locking element being in its locking position.
Figure 3:
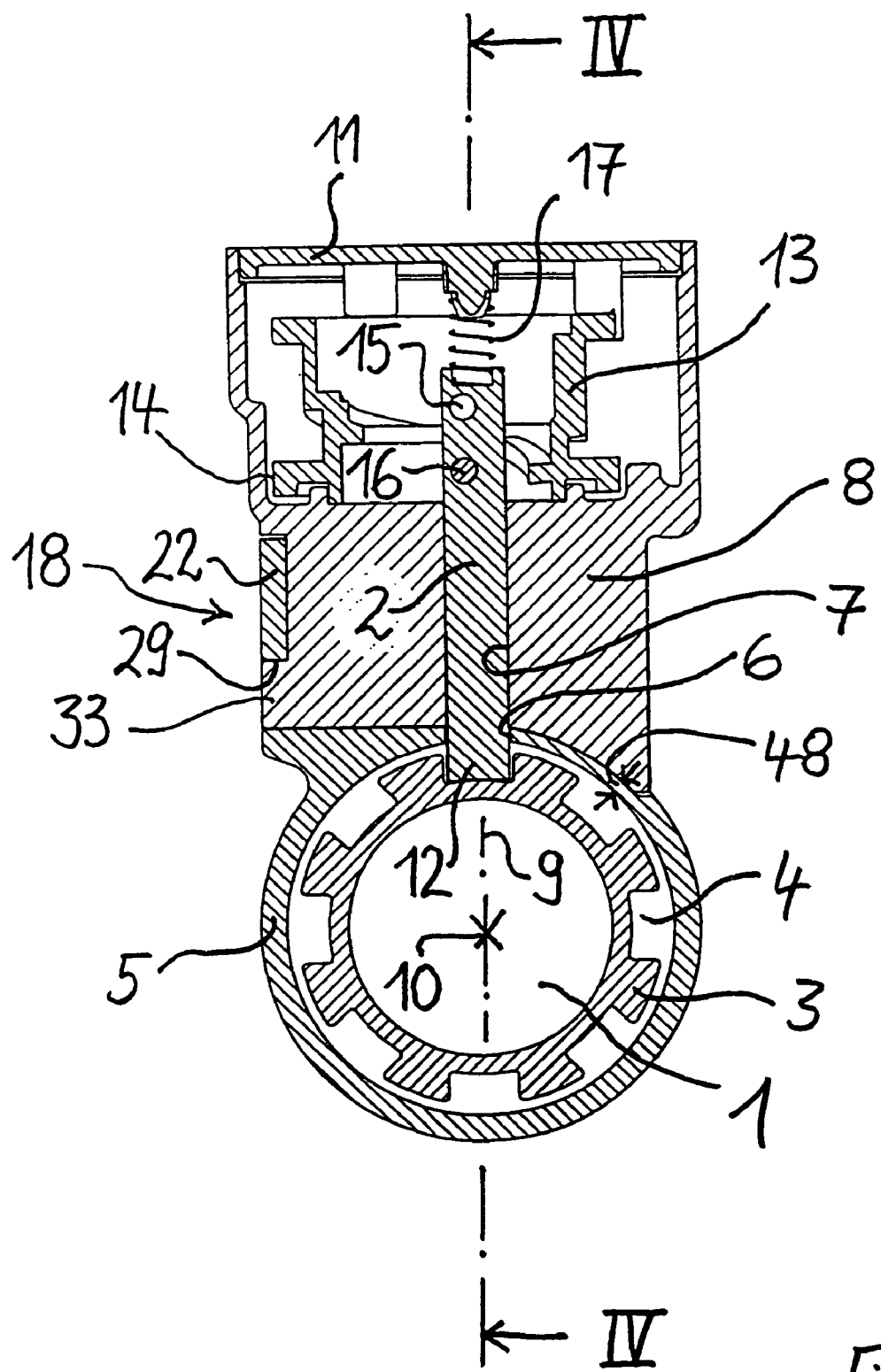
FIG. 3 is the cross-section along line III—III of FIG. 1, the locking element being in its locking position.
Figure 4:
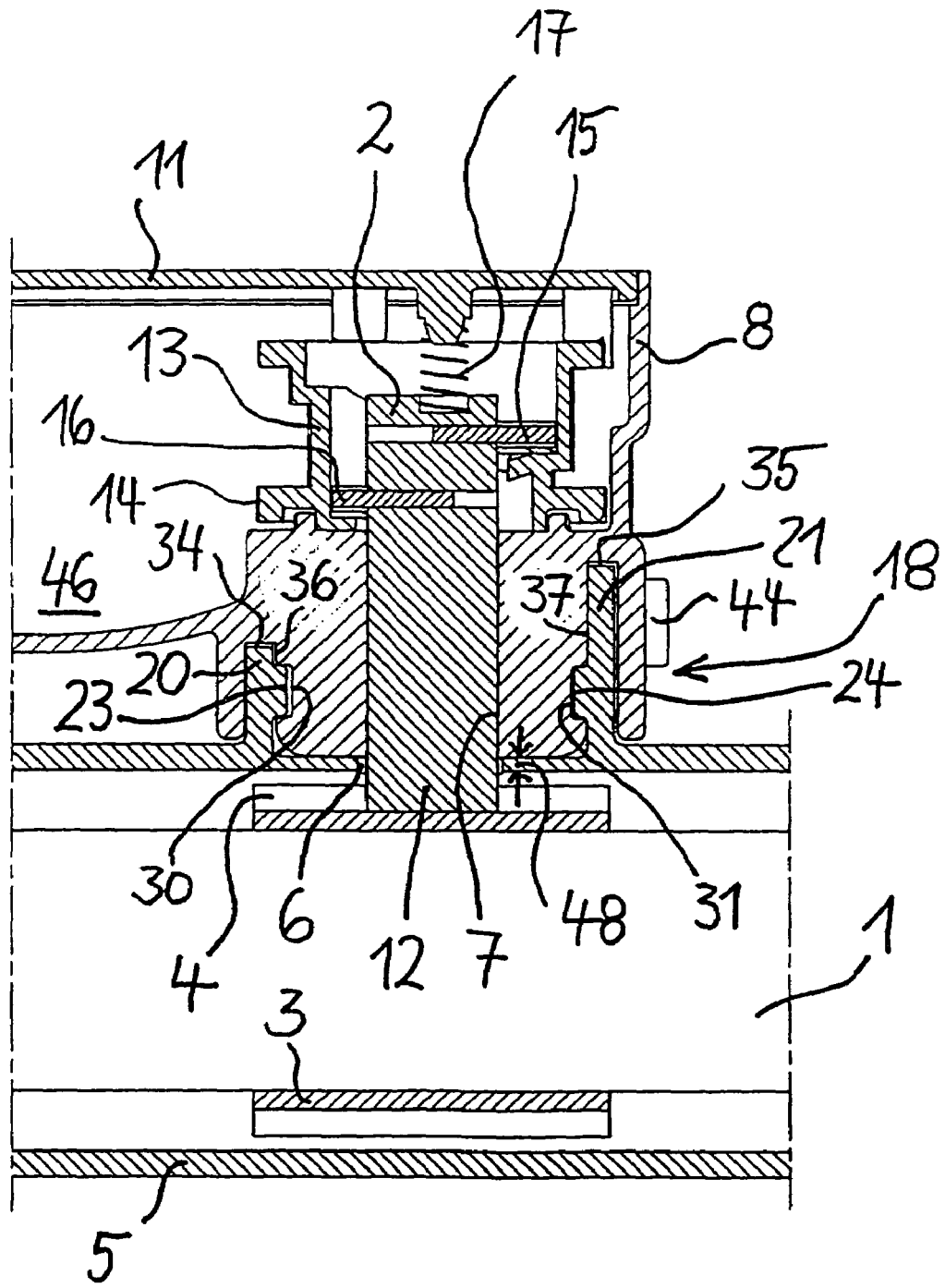
FIG. 4 is the longitudinal section along line IV—IV of FIG. 3.
Figure 5:
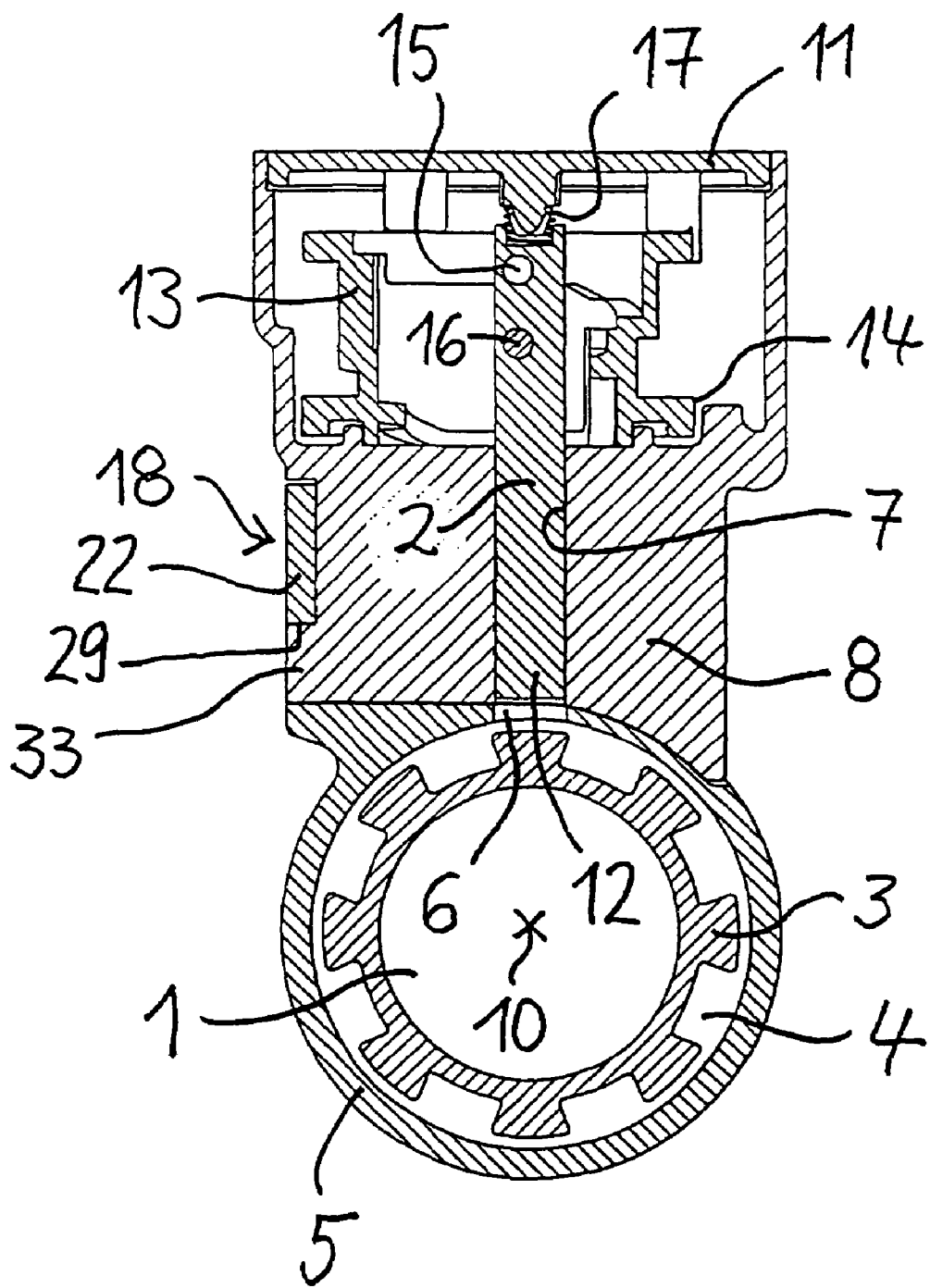
FIG. 5 is the cross-section of FIG. 3, the locking element being in its release position.

The locking element 2 is displaceable to-and-fro between the locking position shown in FIGS. 2 through 4, wherein it engages, by its end 12 near the steering shaft 1, a locking groove 4 of the locking bush 3, as a result of which the steering shaft 1 no longer can be rotated, and the release position shown in FIG. 5, wherein the locking element 2 does not engage by its end 12 any locking groove 4 of the locking bush 3 and therefore releases the steering shaft 1 which then may be rotated.

A control element 13 driven by a reversible electric motor (not shown) in one or the opposite rotational direction serves to axially displace the locking element 2 into the release position and in the opposite direction into the locking position. The control element 13 is disposed substantially coaxially relative to the control element 2 which it encloses and is supported in the housing 8 in a manner to rotate about an axis parallel to the longitudinal axis 9 of the locking element opening 7 between an annular surface—which is coaxial with said former axis—of the housing 8 and a ring of inner protrusions of the housing lid 11 coaxial with said axis. The control element 13 is a tubular worm gear with external teeth 14 which are engaged by a drive worm (not shown) affixed to the electric motor's output shaft.

The control element 2 is fitted with two external protrusions 15, 16 cooperating with two inner bevels of the control element 13. The slopes of the two bevels are the same and the two bevels each merge at their two ends into a respective end surface situated in a plane which is perpendicular to the axis of rotation of the control element 13. A helical compression spring 17 is disposed between the locking element 2 and the housing lid 11 and forces the protrusions 15, 16 of the locking element 2 against the bevels and the end surfaces of the control element 13.

When the locking element 2 is in its locking position, its two protrusions 15, 16 each rest on that associated end surface of the control element 13 which is nearer the steering shaft 1. When the locking element 2 assumes the release position, its two protrusions 15, 16 each rest on that associated end surface of the control element 13 which is away from the steering shaft 1. The said electric motor is turned ON to axially displace the locking element 2 against the force of the helical compression spring 17 out of the locking position into the release position and to permit the locking element 2 to move axially by the action of the helical compression spring 17 from the release position into the locking position, whereby said motor will appropriately rotate the control element 13 clockwise resp. counter-clockwise and the two protrusions 15, 16 of the locking element 2 shall run over the two bevels of the control element 13 from the two end surfaces near the steering shaft 1 to the two end surfaces far from the steering shaft 1 and vice-versa from the two end surfaces far from the steering shaft 1 to the two end surfaces of the control element 13 near the steering shaft 1.

Figure 6:
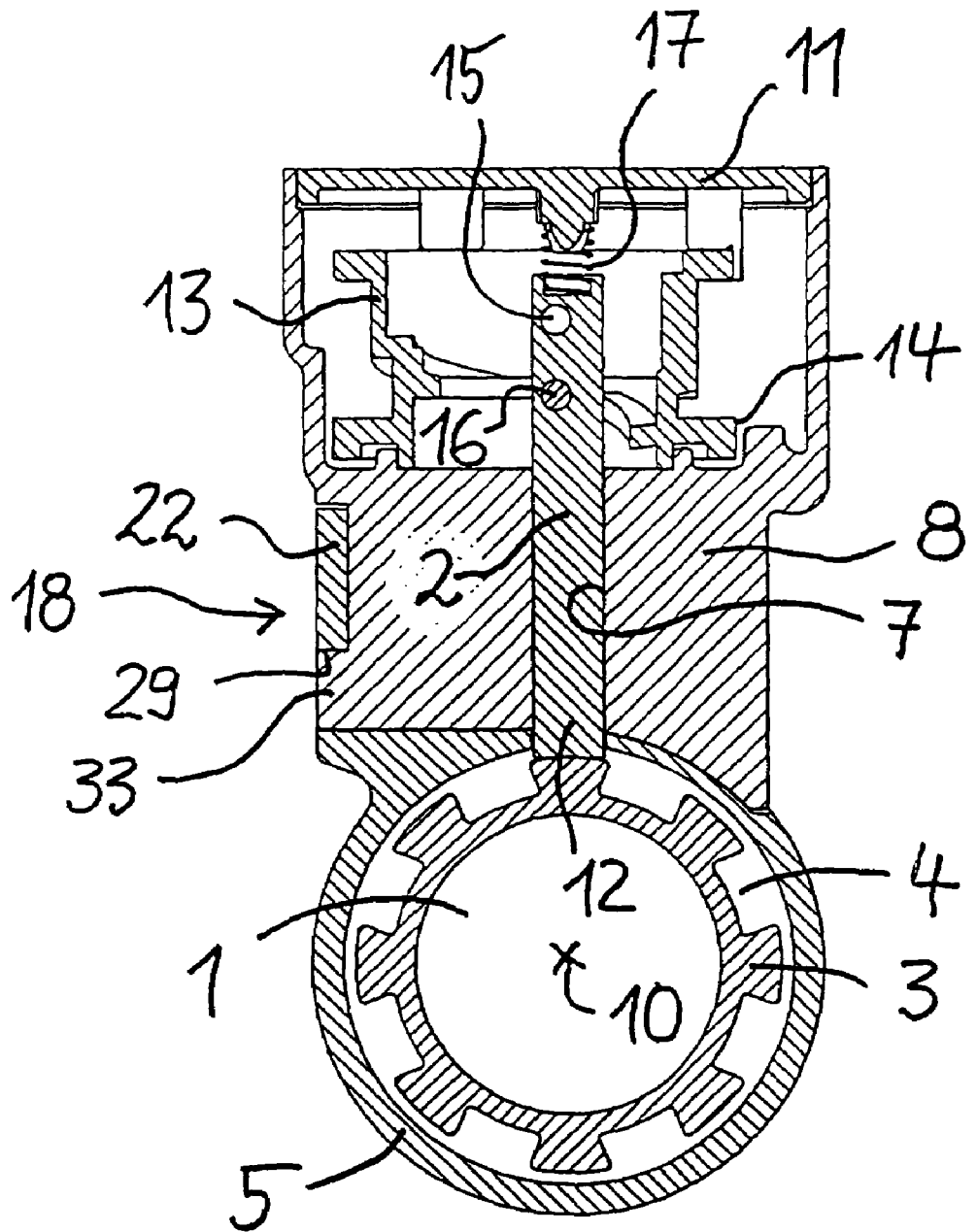
FIG. 6 is the cross-section of FIG. 3, the locking element being in a prelocking position.

As shown in FIG. 6, the control element 13 also may rotate in unhampered manner in the counter-clockwise direction into the rotary position of FIGS. 3 and 4 when no locking groove 4 of the locking bush 3 seated on the steering shaft 1 is aligned with the locking element 2 to receive its free end 12. As regards the prelocked position shown in FIG. 6, the locking element 2 is displaced farther by the helical compression spring 17 in the direction toward the steering shaft 1 for the purpose of engaging by its end 12 one of the two adjacent locking grooves 4 of the locking bush 3 and to assume the locking position shown in FIGS. 2 through 4 as soon as the steering shaft 1 has been rotated in such a way that the locking groove 4 has been aligned with the locking element 2.

Figure 9:
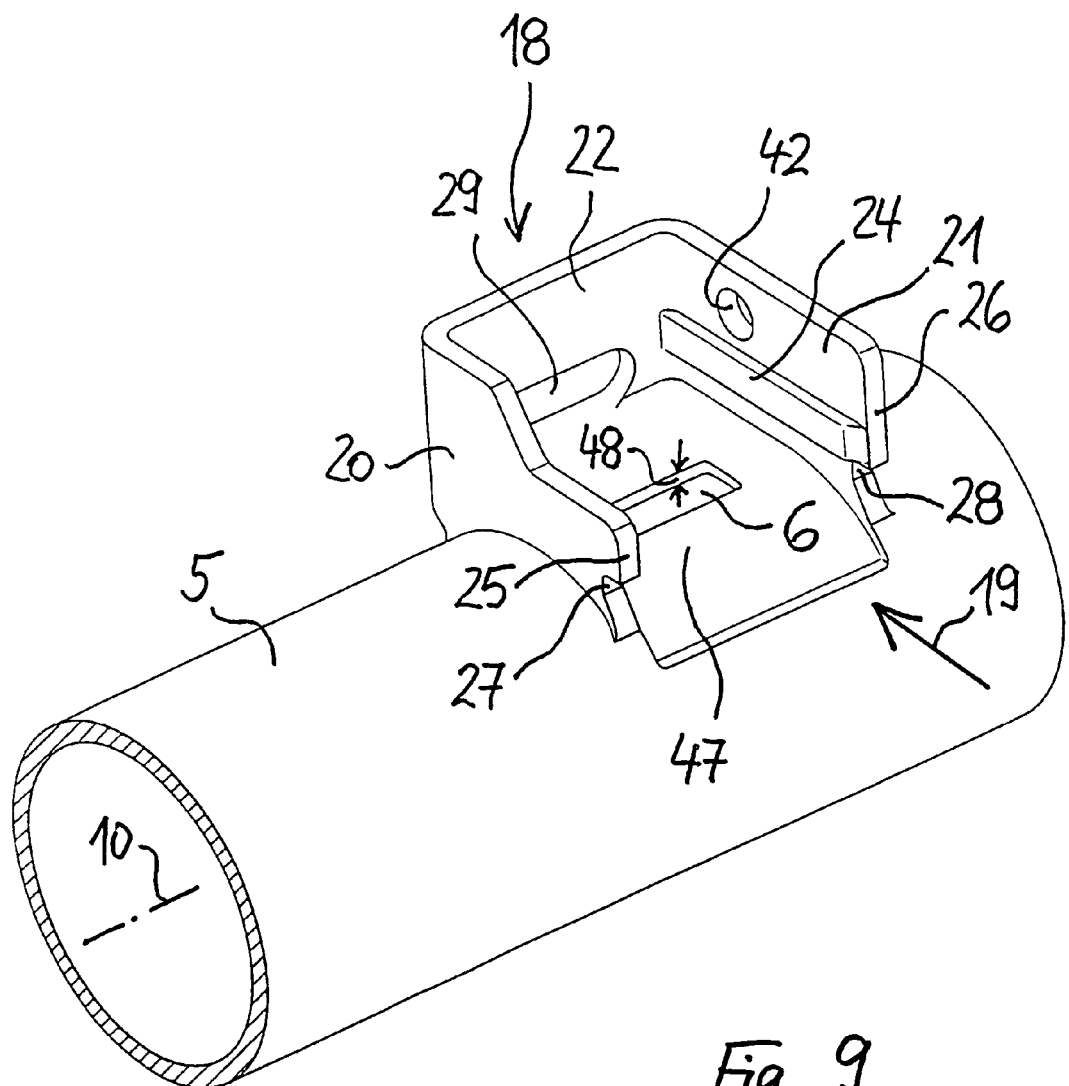
FIG. 9 is the perspective view of the receptacle-fitted tubular casing in the direction of the arrow IX of FIG. 2.
Figure 10:
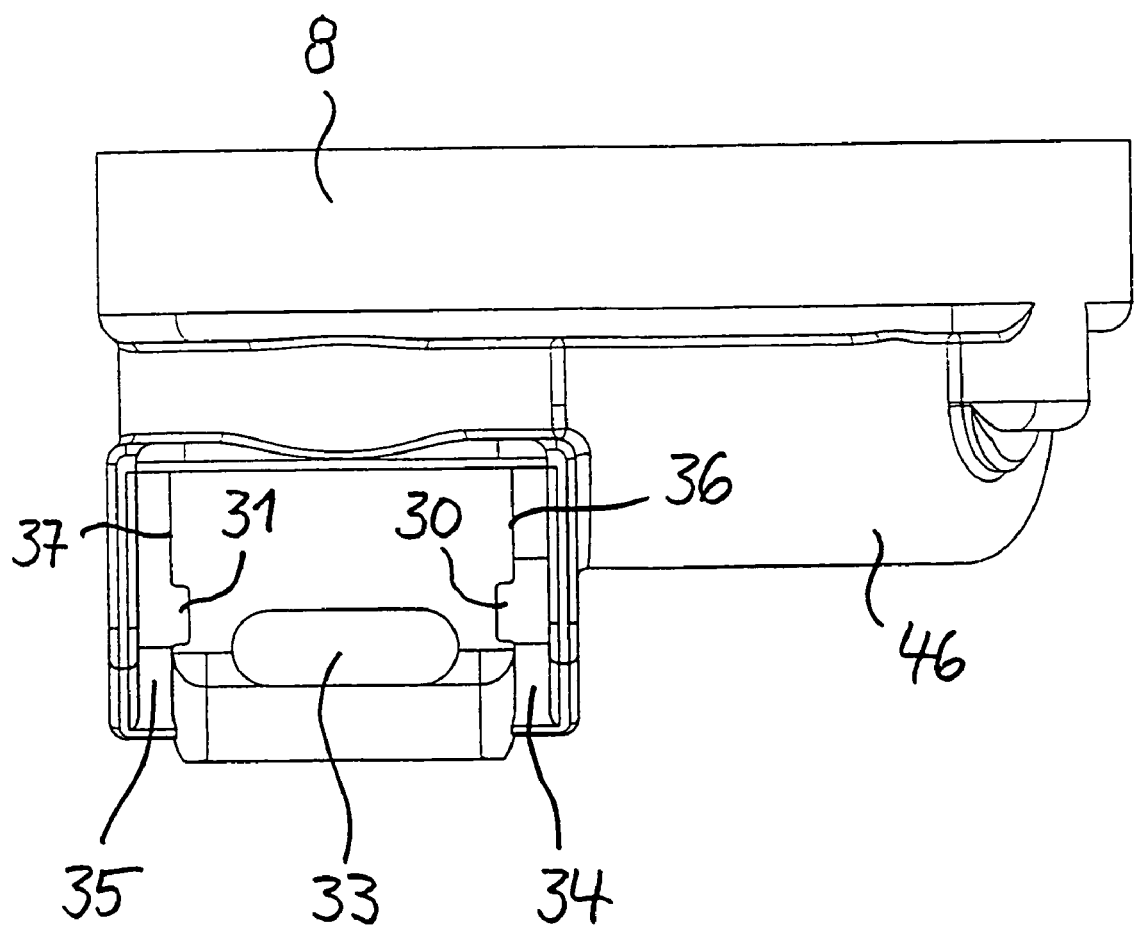
FIG. 10 is the view of the housing in the direction of the arrow I of FIG. 2.
Figure 11:
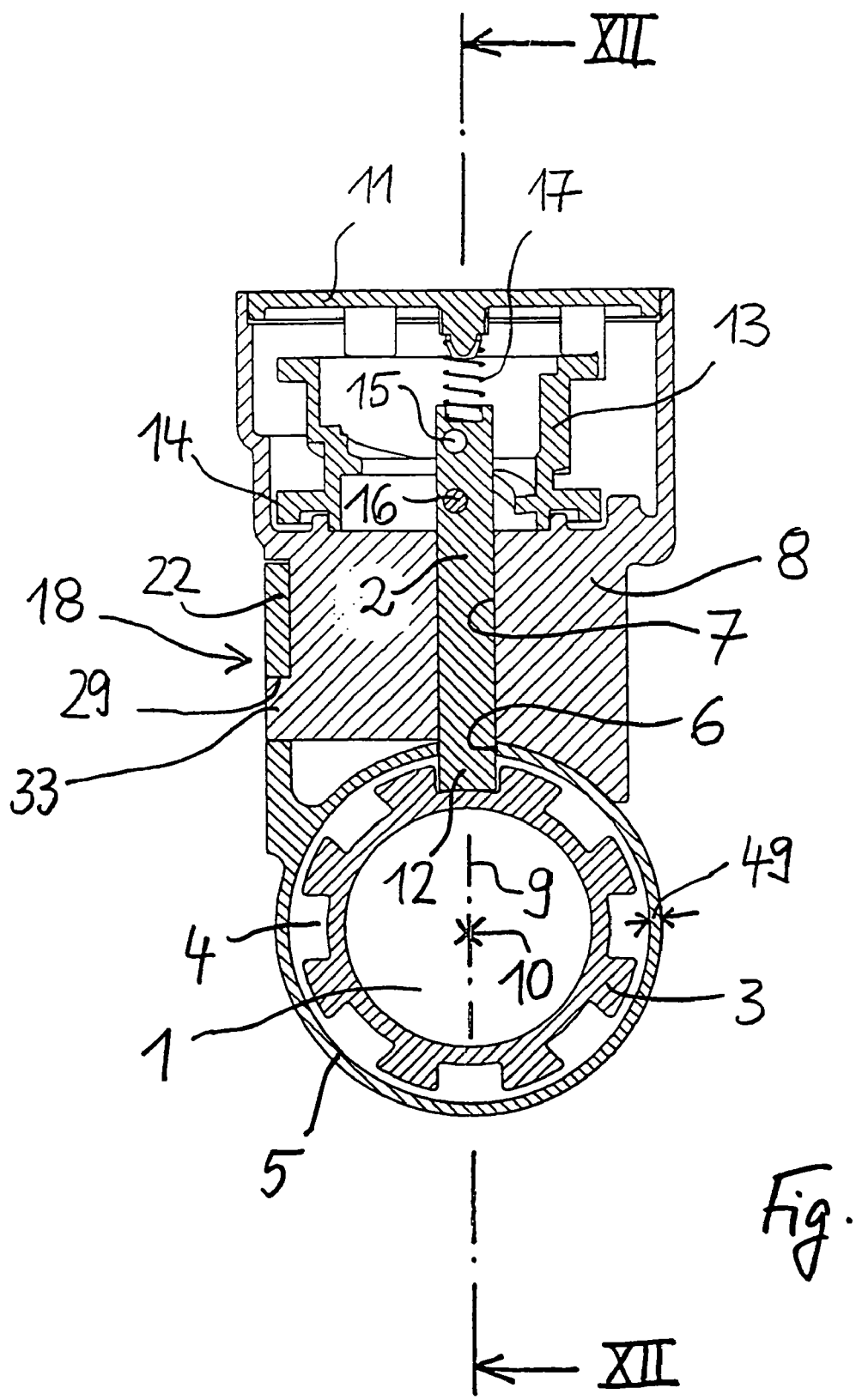
FIG. 11 is the cross-section of a second embodiment corresponding to the cross-section of FIG. 3.
Figure 12:
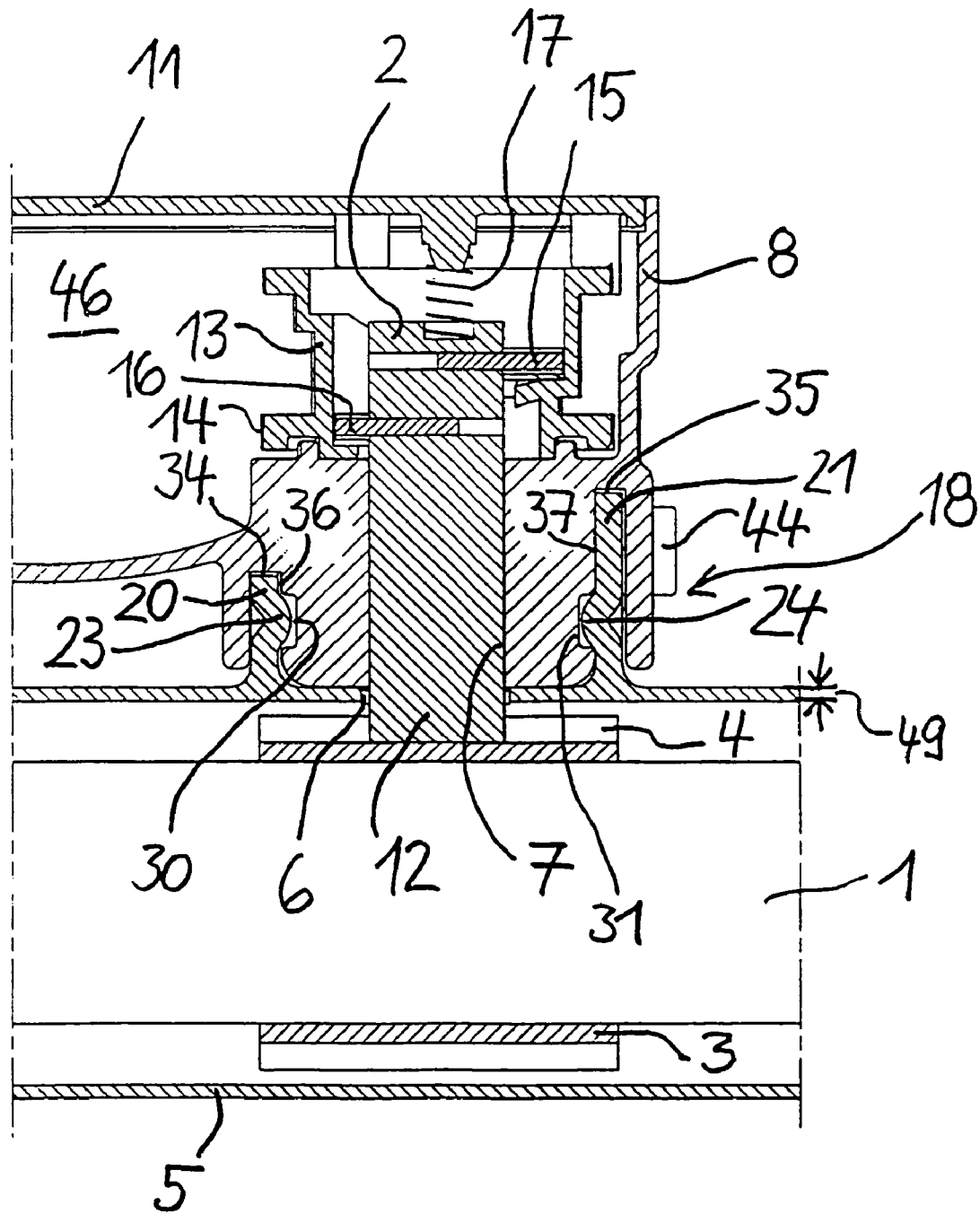
FIG. 12 is the longitudinal section along line XII—XII of FIG. 11.
Figure 13:
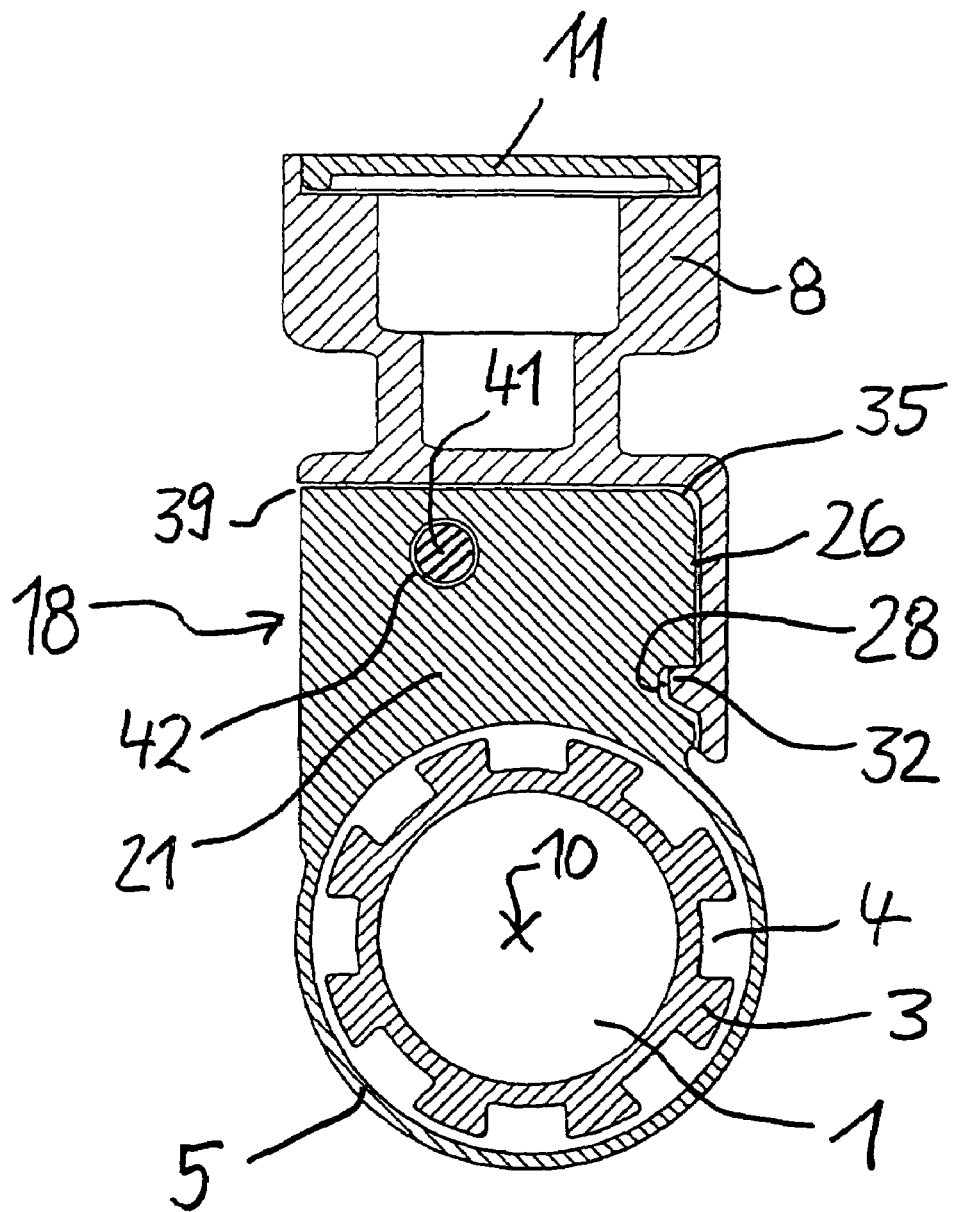
FIG. 13 is the cross-section of the second embodiment corresponding to the cross-section of FIG. 8.
Figure 14:
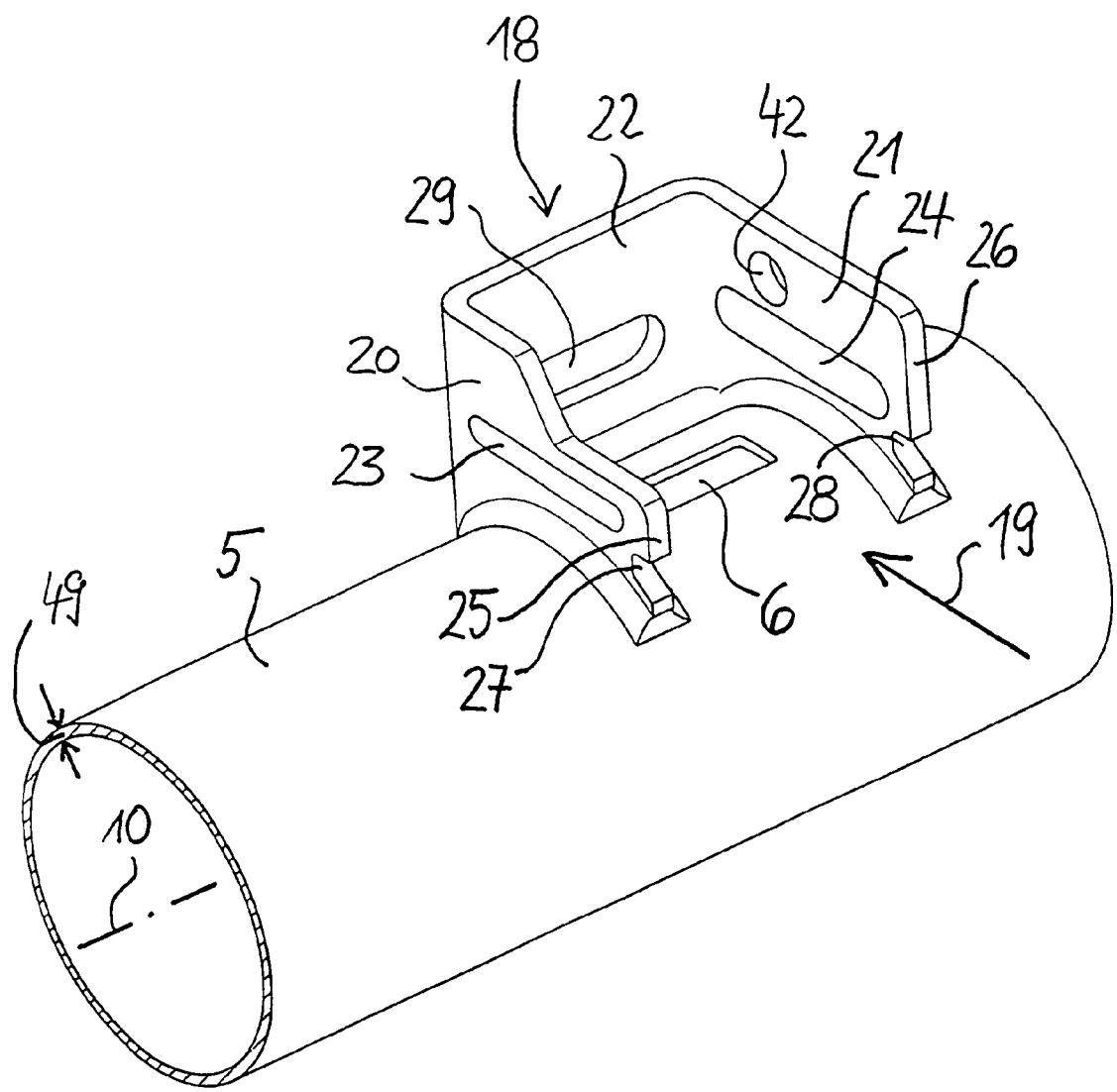
FIG. 14 is the view of the receptacle-fitted tubular casing of the second embodiment mode and corresponding to the view of FIG. 9.

The tubular casing 5 is fitted with an external receptacle 18 for the housing 8 so that said housing 8 may be detachably affixed to the tubular casing 5, the housing 8 being inserted into said receptacle 18 transversely to the longitudinal axis 10 of the tubular casing 5 in the direction of the arrow 19 in FIGS. 9, 14. The receptacle 18 is U-shaped and comprises two side walls 20, 21 running transversely to the longitudinal axis 10 of the tubular casing 5 and an end wall 22 running parallel to said tubular casing's longitudinal axis 10, said end wall 22 running in a tangential plane of the tubular casing 5 perpendicular to the housing insertion direction 19.

The two side walls 20, 21 of the receptacle 18 disposed each on one side of the locking element passage aperture 6 of the tubular casing 5 are fitted with two mutually opposite inner protrusions 23, 24 running parallel to the housing insertion direction 19, said side walls 20, 21 each comprising a recess 27 resp. 28 at the end edge 25 resp. 26 away from the end wall 22 of the receptacle 18. The end wall 22 of the receptacle 18 is fitted with an aperture 29 in the form of an elongated hole (slot) running parallel to the longitudinal axis 10 of the tubular casing 5.

The housing 8 comprises two mutually parallel channels 30, 31 and a projection 32 resp. 33 at each end of the pair of channels 30, 31 and two mutually parallel pockets 34, 35 on both sides of the locking element opening 7. The channels 30, 31 are formed in the mutually adjacent side walls 36, 37 of the pockets 34, 35 which each are open at the end 38 resp. 39 near the projection 33 and on the side of the housing 8 where the locking element 2 exits the opening 7.

The housing 8, is slid into the receptacle 18 when the locking element 2 has been retracted into the opening 7 of the housing 8, as in the case of the release position of FIG. 5. During insertion, the open ends 38, 39 of the pockets 34, 35—which are also open on the side facing the tubular casing 5—of the housing 8 are in front (leading) in the direction of insertion 19.

When the housing 8 has been inserted into the receptacle 18, the two side walls 20, 21 of said receptacle 18 are each received in the pocket 34 or respectively 35 of the housing 8 and are protected therein. Moreover the two inner protrusions 23, 24 of the receptacle 18 each engage the channel 30 or respectively 31 of corresponding cross-section of the housing 8 and the two projections 32, 33 of the housing 8 each enter the two recesses 27, 28 or resp. the elongated hole (slot 29) of the receptacle 18. For that purpose the projection 32 cooperating with the two recesses 27, 28 is fitted with a cross-section corresponding to the shape of the recesses 27, 28 and the projection 33 cooperating with the elongated hole (slot) 29 is designed as a strip of corresponding contour.

This positive (mechanical) interlock between the housing 8 and the receptacle 18 jointly with the U-geometry of the receptacle 18 assures that the housing 8 can be moved out of the receptacle 18 only in a direction opposite that of the arrow 19. This movement, however, is only possible, when the locking element 2 assumes the release position of FIG. 5, but not when this locking element 2 assumes the locking position of FIGS. 2 through 4 or the pre-locking position of FIG. 6, because in the latter cases the end 12 of the locking element 2 crosses the passage aperture 6 of the tubular casing 5 provided within the receptacle 18 and enters a locking groove 4 of the locking bush 3 mounted on the steering shaft 1, or engages the passage aperture 6 of the tubular casing 5.

Figure 7:
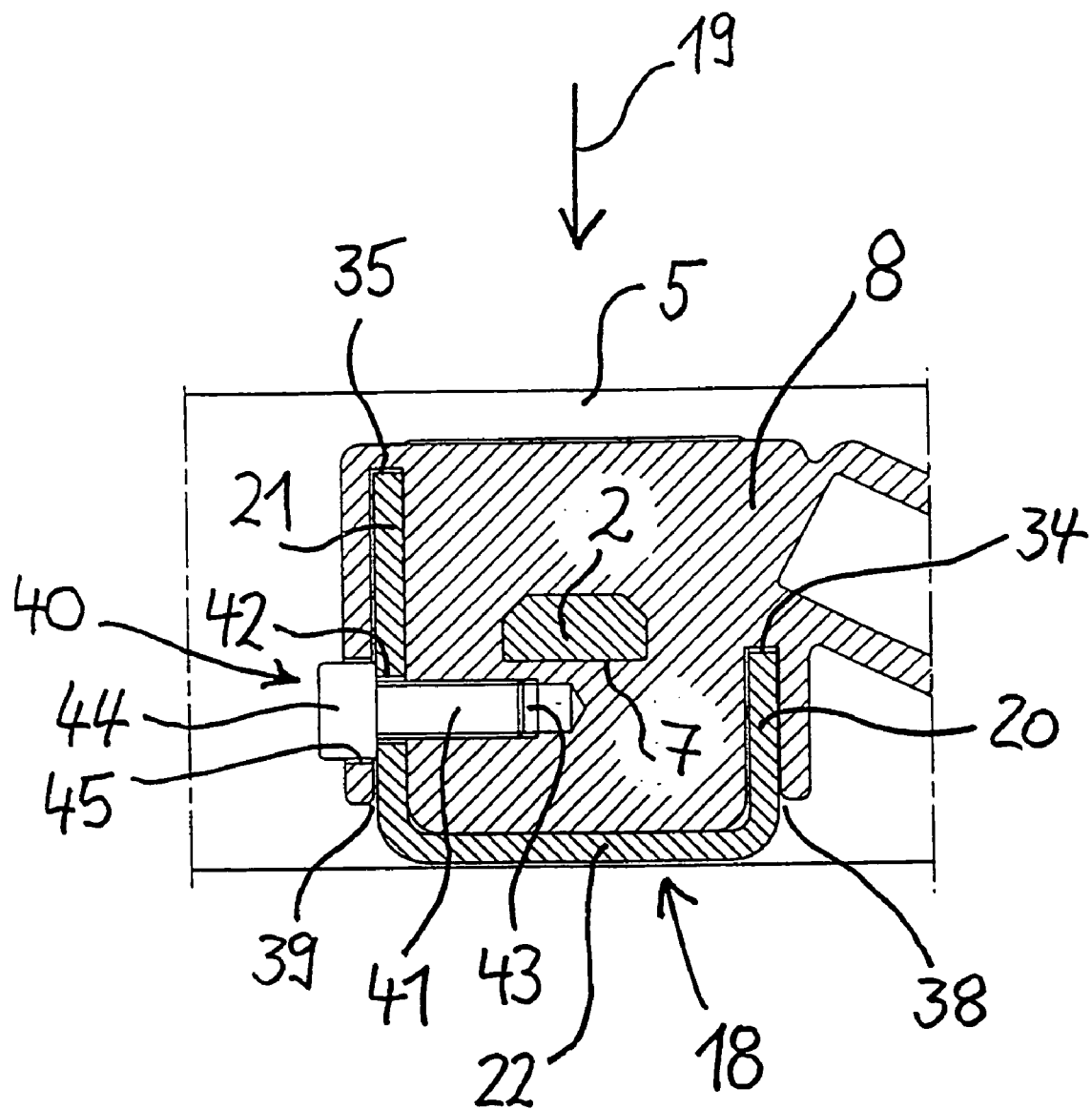
FIG. 7 is the section along line VII—VII of FIG. 1.
Figure 8:
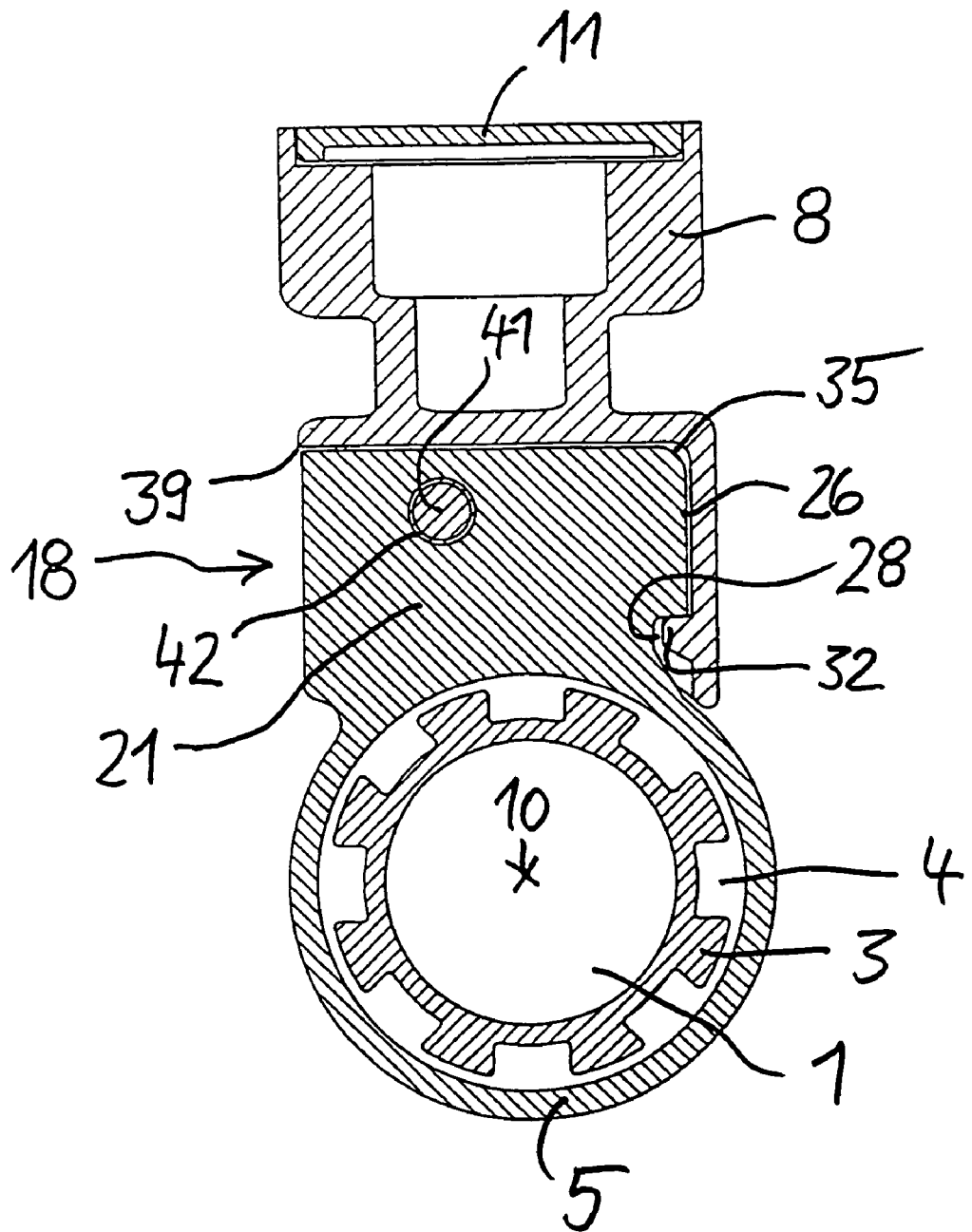
FIG. 8 is the cross-section along line VIII—VIII of FIG. 1.

The receptacle 18 and the housing 8 inserted into it are tightened together by a screw 40 to prevent rattling and to be mutually affixed even in the release position of the locking element 2 shown in FIG. 5, the shank 41 of said screw 40 running through a hole 42 in the left sidewall 21 of the receptacle 18 shown in FIG. 7 and being screwed into a thread hole 43 of the housing 8. The head 44 of the screw 40 rests against the side wall 21 of the receptacle 18 on that side of the side wall 21 which is away from the locking element 2 and the thread hole 43 of the housing 8 and is received in a hole 45 of the housing 8 leading into the pocket 35 of the housing 8 containing the side wall 21.

Accordingly the housing 8 is very easily assembled to, and disassembled from, the tubular casing 5, however unauthorized disassembly is precluded when the locking element 2 assumes its locking or pre-locking position.

The housing 8 comprises a laterally projecting part 46 within which are arranged the electric motor driving the control element 13 and the drive worm meshing with the outer teeth 14 of the control element 13. After the housing 8 has been inserted into the receptacle 18, the laterally projecting part 46 of the housing 8 runs parallel to the longitudinal axis 10 of the tubular casing 5, as a result of which and in the light of the scant possibilities of unauthorized access, it will be very difficult and perhaps impossible to forcefully remove the housing 8 from the tubular casing 5.

As regards the device of FIGS. 1 through 10, the tubular casing 5 and the receptacle 18 are cast integrally. The design of the receptacle 18 allowing the housing 8 to be inserted, i.e. pushed in in a direction transverse to and crossing the longitudinal axis 10 of the tubular casing 5, makes possible jointly casting the tubular casing 5 and the receptacle 18 without being subjected to any restrictions about the shape of the tubular casing 5 or with respect to the casting equipment.

Essentially the device of FIGS. 11 through 14 differs from that of FIGS. 1 through 10 only in that the tubular casing 5 and the receptacle 18 each is made of sheet metal and they are welded together.

In the device shown in FIGS. 1 through 10, the cast tubular casing 5 exhibits a lesser wall thickness 48 in the region 47 within the cast receptacle 18, as shown in particular detail in FIG. 4. This reduced wall thickness 48 corresponds to the wall thickness 49 of the comparable sheetmetal tube 5 of the device of FIGS. 11 through 14, and as a result the same housing 8 of FIG. 10 may be assembled both to the cast tubular casing 5 of FIG. 9 and to the sheetmetal tubular casing 5 of FIG. 14.

The invention claimed is:

1. A device for irrotationally locking a motor vehicle's steering shaft (1) using a locking element (2) mounted in a housing (8) and displaceable to-and-fro between a locking position and a release position, the housing (8) being detachably affixed to a tubular casing (5) enclosing the steering shaft (1) and having a longitudinal axis (10), wherein the tubular casing (5) comprises an external receptacle (18) into which the housing (8) may be inserted, and wherein said receptacle and said housing are arranged such that the housing (8) may slide transversely relative to the longitudinal axis (10) in a direction not intersecting the axis into the receptacle (18) and the locking element is displaceable to-and-fro between the locking position and the release position in a direction perpendicular to said sliding direction.

2. Device as claimed in claim 1, wherein the receptacle (18) is U-shaped and comprises two side walls (20, 21) running transversely relative to the longitudinal axis (10) of the tubular casing (5) but not intersecting said axis, and further including an end wall (22) running parallel to the longitudinal axis (10) of the tubular casing (5).

3. Device as claimed in claim 2, wherein the end wall (22) of the receptacle (18) runs perpendicularly to the housing insertion direction (19).

4. Device as claimed in claim 3, wherein that the end wall (22) of the receptacle (18) runs tangentially to the tubular casing (5).

5. Device as claimed in claim 2, wherein the two side walls (20, 21) of the receptacle (18) are fitted with two mutually opposite inner protrusions (23, 24) running parallel to the housing insertion direction (19) and engaging two channels (30, 31) of the housing (8).

6. Device as claimed in claim 2, wherein the end wall (22) of the receptacle (18) is fitted with an aperture (29) receiving a projection (33) of the housing (8).

7. Device as claimed in claim 6, wherein the aperture (29) of the end wall (22) of the receptacle (18) is configured as an elongated hole extending parallel to the longitudinal axis (10) of the tubular casing (5) and in that the projection (33) of the housing (8) is shaped as a strip of matching contour.

8. Device as claimed in claim 2, wherein the two side walls (20, 21) of the receptacle (18) each are fitted at the end edge (25, 26) away from the end wall (22) of the receptacle (18) with a recess (27, 28) receiving a projection (32) of the housing (8).

9. Device as claimed in claim 2, wherein the housing (8) comprises two mutually parallel pockets (34, 35) which are open at the ends (38, 39) leading in the housing insertion direction (19) and open on the side facing the tubular casing (5) and which receive the two side walls (20, 21) of the receptacle (18).

10. Device as claimed in claim 1, wherein the receptacle (18) and the housing (8) slid into it are mutually clamped by a screw (40).

11. Device as claimed in claim 10, wherein the shank (41) of the screw (40) passes through a hole (42) in a side wall (21) of the receptacle (18) and is screwed into a thread hole (43) of the housing (8).

12. Device as claimed in claim 1, wherein the tubular casing (5) is fitted with a passage aperture (6) within the receptacle (18) to receive the locking element (2) and the housing (8) inserted into the receptacle (18) is locked against withdrawal from said receptacle (18) by the locking element extending through the passage aperture when the locking element (2) is not in its release position.

13. Device as claimed in claim 1, wherein the locking element (2) is shaped as a bolt and is axially displaceable in the housing (8) inserted into the receptacle (18) along a path which is substantially perpendicular to the longitudinal axis (10) of the steering shaft (1).

14. Device as claimed in claim 1, wherein the housing (8) comprises a laterally projecting part (46) which, upon insertion of the housing (8) into the receptacle (18), runs parallel to the longitudinal axis (10) of the tubular casing (5).

15. Device as claimed in claim 1, wherein the tubular casing (5) is a sheet metal tube welded together with the sheet metal receptacle (18).

16. Device as claimed in claim 1, wherein the tubular casing (5) and the receptacle (18) are cast as one integral component.

17. Device as claimed in claim 16, wherein the cast tubular casing (5) has a reduced wall thickness (48) in the region (47) inside the cast receptacle (18).

* * * * *

UNITED STATES PATENT AND TRADEMARK OFFICE
CERTIFICATE OF CORRECTION

PATENT NO. : 7,104,097 B2
APPLICATION NO. : 10/486368
DATED : September 12, 2006
INVENTOR(S) : Horst Zillmann It is certified that error appears in the above-identified patent and that said Letters Patent is hereby corrected as shown below:

Col. 2, line 4, should read: --of the second embodiment ~~mode and~~ corresponding to the--

Col. 2, line 40, should read: --coaxially relative to the locking ~~control~~ element 2 which it encloses--

Col. 2, line 49, should read: --The locking ~~control~~ element 2 is fitted with two external protru- --

Signed and Sealed this

Twenty-fourth Day of April, 2007

JON W. DUDAS
*Director of the United States Patent and Trademark Office*